March 19, 1963  H. C. COLLINS  3,081,576
FISH HOLDER
Filed Dec. 5, 1961
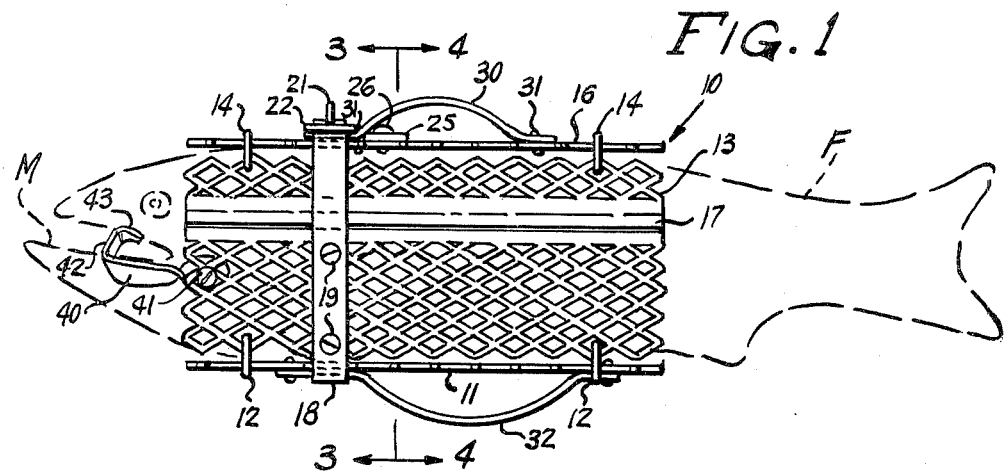
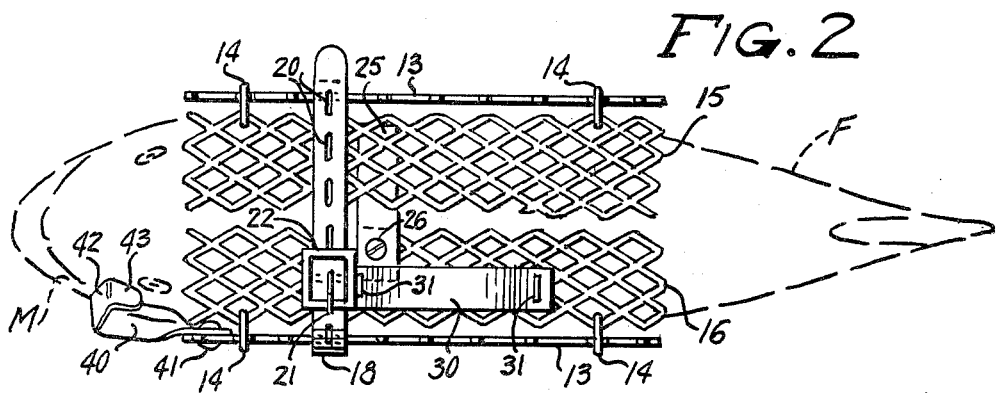
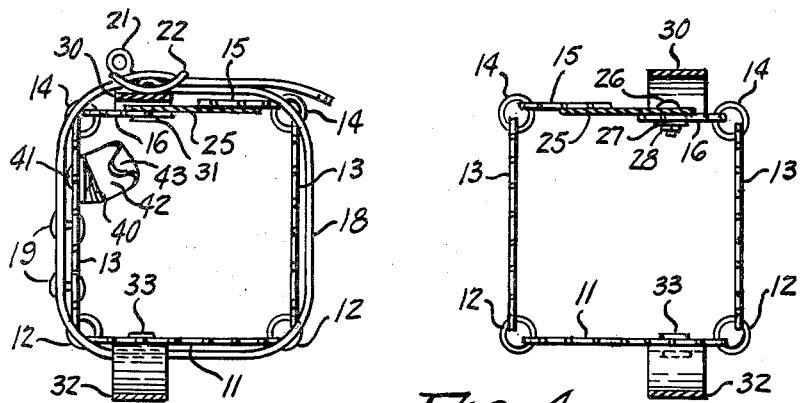
INVENTOR.
HARRY C. COLLINS
BY Kimmel & Crowell
ATTORNEYS.

United States Patent Office 3,081,576
Patented Mar. 19, 1963

3,081,576
FISH HOLDER
Harry C. Collins, 11 W. 3rd St., Ocala, Fla.
Filed Dec. 5, 1961, Ser. No. 157,139
1 Claim. (Cl. 43—53.5)

This invention relates to a fish holder, and has as its primary object the provision of a device which is adapted to be positioned about the body of a still live struggling fish in order to hold the fish against slipping back into the water, as well as to protect the hands from injury from the fins or scales thereof.

An additional object of the invention is the provision of such a holder provided with a spacer or separator adapted to be positioned in the mouth of the fish within the holder so that hook or the like may be readily removed from the fish.

An additional object of the invention is the provision of a device of this character which while primarily adapted for holding large fish against slippage is variable in size to a desired extent to hold smaller or larger fish.

A further object of the invention is the provision of such a device comprised of a hinged metal lattice work structure adapted to be secured about the body of a fish by means of a clasping strap, having handhold portions on either side so that the fish may be grasped firmly between the thumb and fingers, for example.

A further object of the invention is the provision of such a device which is readily applicable to the body of a fish to be held with a comparative minimum of effort and difficulty.

Still another object of the invention is the provision of such a device which may be alternatively employed as a carrier for large fish, for example, those too large to fit in the creel of a fisherman.

Still other objects reside in the combinations of elements, arrangements of parts, and features of construction, all as will be more fully pointed out hereinafter and shown in the accompanying drawing wherein:

FIGURE 1 is a side elevational view of the fish holder of the instant invention showing a fish in dotted lines contained therein.

FIGURE 2 is a top plan view of the construction of FIG. 1.

FIGURE 3 is a sectional view taken substantially along the line 3—3 of FIG. 1 as viewed in the direction indicated by the arrows; and FIGURE 4 is a sectional view taken substantially along the line 4—4 of FIG. 1 as viewed in the direction indicated by the arrows.

Similar reference characters refer to similar parts throughout the several views of the drawings.

Having reference now to the drawings in detail, the device of the instant invention is generally indicated at 10 and comprises a bottom body portion 11 which may be positioned under the belly of a fish, comprised of foraminous latticed metal or the like, and of a length sufficient to encompass substantially the major portion of the length of a large fish. Hinge rings 12 secured at spaced intervals to the bottom plate 11 secure a pair of side plates 13 of similar latticed metal construction to the bottom plate which are adapted to extend in upright relation along the sides of the body of a fish. Additional rings 14 also positioned at adequately spaced intervals along the top of the side walls 13 secure two separable half portions 15 and 16 of a top lattice to the upper ends of the side walls.

A solid metal reinforcing strip 17 may extend along one or both of the side walls 13 as desired.

A clamping strap 18 is secured to one of the side walls 13 by means of bolts and nuts 19, and is of a length sufficient to extend completely around the holder, provided with perforations 20 at its free end adapted to engage the prong 21 of a buckle 22 carried by the other end.

A relatively rigid laterally extending projection 25 is bolted as by means of a bolt 26 and a washer 27 and nut 28 to an intermediate point of one of the top sections 16 and extends laterally therefrom beneath the adjacent section 15, to serve as a support for the same and hold the same in position over the back of the fish. A finger or thumb strap 30 is secured as by staples 31 or the like to the top portion 16, while a similar hand strap 32 is similarly secured by staples 33 to the bottom plate 11, the arrangement being such that the thumb or fingers may be slipped beneath either of the straps or handle members 30 and 32 and firmly grasp the holder to hold the fish tightly there within.

An arm or projection 40 extends from one end of one of the side walls 13 and is secured thereto by a bolt or rivet 41. The projecting member 41 includes an offset internally extending angularly disposed end portion 42 which has a reverted end 43 extending parallel to the portion 40 and which is adapted to engage in the mouth end of a fish F for holding the mouth open while a hook or a lure is removed therefrom.

After the fish has ceased to struggle, the device may be removed simply by unbuckling the end of the strap 18 from the buckle 22 and the fish deposited as desired, and the device is then ready for reuse.

Alternatively, in the event of an exceptionally large or heavy fish, the holder may be used as a carrying means and the fish carried by means of either the handle member 30 or the member 32.

From the foregoing it will now be seen that there is herein provided an improved fish holder which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

A fish holder comprised of a foraminous base plate, foraminous side plates hinged thereto, a pair of foraminous top plates, one hinged to the top of each side plate, forming, when in closed position, a substantially rectangular open ended receptacle adapted to fit around the body of a fish with the head and tail of the fish projecting from the open ends, a strap having a buckle on one end thereof secured to one of said plates for securing the holder in closed position about the body of a fish, hand hold straps on said bottom plate and one of said top plates, a transverse reinforcing bar secured to one of said top plates and underlying the other of said top plates, and a reverted sheet metal projection secured to one end of one of said side plates internally of the closed receptacle and inclined upwardly toward said top plates, adapted to hold the mouth of a fish open while a hook is removed therefrom.

References Cited in the file of this patent
UNITED STATES PATENTS

| | | |
|---|---|---|
| 283,980 | Eastwood | Aug. 28, 1883 |
| 1,016,635 | Johnson et al. | Feb. 6, 1912 |
| 1,247,935 | Conway | Nov. 27, 1917 |
| 2,508,559 | Worthington | May 23, 1950 |
| 2,661,116 | Bombarger | Dec. 1, 1953 |